United States Patent Office 3,639,301
Patented Feb. 1, 1972

3,639,301
HEAT-AGED NEOPRENE LATEX
Mortimer A. Youker, Clearwater, Fla., assignor to E. I. du Pont de Nemours and Company, Wilmington, Del.
No Drawing. Continuation-in-part of application Ser. No. 571,992, Aug. 12, 1966, which is a continuation-in-part of application Ser. No. 468,554, June 30, 1965. This application Apr. 30, 1968, Ser. No. 725,520
The portion of the term of the patent subsequent to June 17, 1986, has been disclaimed
Int. Cl. C08d 5/00, 13/08, 3/14
U.S. Cl. 260—2.5 L         6 Claims

ABSTRACT OF THE DISCLOSURE

An improved polychloroprene latex, useful for making polyisocyanate-modified foams, comprises the product produced by heating a freshly prepared polychloroprene latex, having a pH higher than 11, at a temperature in the range of 60 to 90° C. until the pH is lowered to the range of 9.5 to 10. In a preferred embodiment the heating is carried out on a latex containing about 50% solids and the latex is subsequently creamed to about 60% solids.

CROSS-REFERENCE TO RELATED APPLICATIONS

This application is a continuation-in-part of my prior U.S. application Ser. No. 571,992, filed Aug. 12, 1966 as a continuation-in-part of my then copending U.S. application Ser. No. 468,554, filed June 30, 1965 and now abandoned.

BACKGROUND OF THE INVENTION

This invention is in the field of elastomers and more particularly of improved elastomeric polychloroprene latices and processes for their preparation.

Latices of polychloroprene are well known and are described, for instance, in "Neoprene Latex" by John C. Carl, copyright 1962 by E. I. du Pont de Nemours & Co. Neoprene is the generic name for the whole family of elastomers based on polychloroprene. The Carl text discloses that, as manufactured, general purpose neoprene latices have a pH above 12.0 and that the alkali represented by this relatively high pH is slowly neutralized by minute amounts of hydrochloric acid released from the neoprene polymer, with a resultant decline of pH. According to Carl, as a result of the acid-alkali reaction there is a gradual increase in the amount of salt in the latex, and this is one of the reasons for a gradual decrease in stability with age. Air, agitation and heat all tend to accelerate the decline in pH. The teachings of the Carl text are herein incorporated by reference.

Kurt L. Seligman, Industrial and Engineering Chemistry, 49, 1709, 1957, examined the change of tensile and elongation at break of vulcanized polymer with age of latex at 50° C.—see FIG. 9. On the basis of these and other data the industrial practice has been to store neoprene latices, if possible, at temperatures well below 50° C. until final use.

SUMMARY

Now according to the present invention it has been found that by heating a freshly prepared polychloroprene latex, having a pH higher than 11, at a temperature in the range of 60 to 90° C. until the pH is lowered to the range of 9.5 to 10, preferably employing a latex containing about 50% solids and creaming the heat-aged latex to about 60% solids, a latex is obtained which is particularly well adapted to the manufacture of polyisocyanate-modified polychloroprene foams.

DESCRIPTION OF THE PREFERRED EMBODIMENTS

The starting material used in this invention may broadly be any of the various types of polychloroprene latices (hereinafter sometimes called neoprene latices) with which the art is already familiar provided they are freshly prepared and have a pH above 11. By "freshly prepared" is meant that the latex has not yet begun to show the decline in pH which characterizes shelf aging. It will be understood that a latex will remain "fresh" longer if held at relatively cool temperatures such as 20° C., if necessary by refrigeration. The latex can be made by methods already known in the art, certain methods being shown, for instance, in "Introduction to Rubber Technology" edited by Maurice Morton, copyright 1959 by Reinhold Publishing Corporation, at page 335 et seq. This text also describes various types of neoprene latices suitable as starting materials.

The solids concentration in the latex is not critcial to operability of the present processes except as dictated by processes to which the treated latex is subsequently to be subjected. Desirably the concentration is relatively high—commonly as high as 50%. The percent solids is often raised still further, to about 60%, by the creaming-method described in the above-mentioned Carl text, starting at page 13. It is advantageous, when creaming is to be used, to heat-age the latex first and thereafter cream, since in this way formation of coagulum during the heating is substantially avoided.

The temperature of heating can be anywhere in the range from 60 to 90° C. At higher temperatures there is danger that the aging will get out of control and the latex will coagulate. At lower temperatures the time required to achieve the desired aging will be inordinately long. A preferred temperature range is about from 70 to 80° C.

The lowering of pH is critical to the production of the desired type of heat-aged latex. If the pH is not lowered below about 10 the latex will not give the desired type of foams, especially foams modified with polyisocyanates but if lowered beyond about 9.5 the latex will be in danger of gelation prior to its intended use. The latices of this invention are characterized by having adequate stability for normal storage and handling and at the same time having the property of forming elastomeric foams having high load-carrying ability in proportion to their density. The chemical and physical properties of the latices leading to such unpredictable utilities are not apparent from ordinary chemical and physical analysis—rather, the latices can be fully characterized only in terms of their process of preparation.

Methods for converting the heat-aged latices into elastomeric foams are those conventionally used in the rubber industry for making foams. A good review of this art is found in Chapter 18 of the above-mentioned Morton text. The special considerations that apply to making neoprene latex foam are reviewed in the Carl text, at page 89 et seq.

The heat-aged latices of this invention give particularly outstanding foams when modified with polyisocyanates as fully taught in my prior application Ser. No. 571,992, above-identified. The polyisocyanate can be selected from the group consisting of 2,4- and 2,6-toluene diisocyanates; 4,4'-methylene-bis(phenyl isocyanate); metaphenylene diisocyanate; 4,4' - methylene - bis(cyclohexyl isocyanate); decamethylene diisocyanate; and the undistilled polyisocyanates that result from the phosgenation of toluene diamines, phenylene diamines, 4,4'-methylene-bis(cyclohexylamine), 4,4'-methylene-bis(phenylamine); also the methylene - bridged polyphenyl polyamines prepared by condensing about 1.1 to 10 moles of aniline with 1 mole of formaldehyde. More than one of these isocyanates can, of course, be used with a particular latex.

About 10 to 100 parts by weight of the organic polyisocyanate per 100 parts of elastomeric polychloroprene solids in the latex can be used. Advantageously, the polyisocyanate is added during the frothing step of making the foam.

The invention will be better understood by reference to the following illustrative examples. In these examples "neoprene latex type A" is made according to the procedure of Example 1 of U.S. Patent 2,405,724 up to the creaming step, except that 2.0 parts of diethanolamine are used instead of 0.5 part as in the example. The latex contains 48–50% solids and has a pH when fresh of about 12.3.

"Neoprene latex type B" is the product of creaming neoprene latex type A according to the procedure of Example 1 of U.S. Patent 2,405,724. It contains 59–60% solids and has an initial pH of 12.3 and a Brookfield viscosity of 350 cps.

Example 1

A glass jar containing freshly prepared neoprene latex type B is held in a circulating air oven at 70° C. for 72 hours, during which time its pH drops to about 9.5. This latex is tested in the preparation of an isocyanate-modified latex foam as follows:

Three samples of neoprene latices are prepared by compounding together the following components:

| | |
|---|---|
| Neoprene latex as shown | 100 |
| Petrolatum | 3 |
| Zinc oxide | 7.5 |
| Phenyl-beta-naphthylamine | 2 |
| Trialkyl thiourea ("Thiate B") | 2 |
| Sodium dibutyl dithiocarbamate | 1 |

The neoprene latices differ as follows:

| Sample No.: | pH |
|---|---|
| (1) Fresh latex (control) | 11.3 |
| (2) Latex acidified with acetic acid (control) | 9.7 |
| (3) Heat-aged latex | 9.5 |

A gelling system is prepared sufficient to provide for each sample 0.1 part of foam stabilizer and 2 parts of potassium silicofluoride. The foam stabilizer contains 50 parts of C-cetyl-betaine, 40 parts of sodium alkylsulfate surfactants, 10 parts of the sodium salt of alkylnaphthalene sulfonic acid, and 567 parts of water. The compounded latex is frothed with a Hobart mixer using a wire whip for 2–3 minutes, and 20 parts of a polyaryl isocyanate prepared essentially as described in U.S. Patent 2,683,730 and containing about 50% by weight 4,4'-diisocyanato diphenylmethane is mixed in. One minute later the gelling system is added and mixed in for about one minute. The froth is poured into a mold and leveled before gelation occurs. After gelation, the foam is demolded and aged at room temperature prior to curing and drying at 250° F. The foam is not washed.

The superiority of the foam made from the heat-aged latex is apparent from the following physical properties:

| | Density, lb./cu. ft. | Compression/deflection in p.s.i. of— | |
|---|---|---|---|
| | | 25% | 50% |
| Sample No.: | | | |
| 1 | 5.34 | 0.51 | 1.12 |
| 2 | 5.11 | 1.0 | 1.9 |
| 3 | 4.9 | 1.4 | 2.5 |

Example 2

Eighty gallons of neoprene latex type B is agitated in a tank equipped with a jacket in which hot water circulates. Internal temperature is maintained at 75° ±5° C. for 13 hours, during which time the pH drops from an original value of 12.3 to 9.9. The heat-aged latex is found equivalent to that of Example 1, sample 3, for the preparation of latex foam.

The aging procedure of Example 2 is considered disadvantageous for commercial manufacture, however, because the type B neoprene latex is highly viscous and difficult to pump. Also, in heat-aging of this high solids latex considerable coagulum forms on the agitator and other discontinuities in the equipment, resulting in material loss and the expense of cleaning equipment.

Example 3

Seventy-five gallons of neoprene latex type A is held at 75° ±5° C. while being agitated in a jacketed tank as in Example 2. After 30 hours the pH drops from an initial value of 12.3 to 9.9. There is no problem due to viscosity of the latex, and very little coagulum forms. The heat-aged type A latex is then creamed by the procedure of Example 1 of U.S. Patent 2,405,724. After 48 hours the solids content of the product is 59.0% and test latex foams prepared as in Example 1, sample 3, above, are fully satisfactory.

It will be seen that in the examples an oven and a hot-water jacket were used as the heat sources for aging the latex. These sources are, of course, conventional. Any means for heating heat-sensitive materials can be employed, care being taken to avoid local overheating. Steam can be sparged directly into the batch if the resultant dilution due to steam condensation can be tolerated.

I claim:

1. In a process for improving the properties of a polychloroprene latex the step comprising heating a freshly prepared polychloroprene latex, having a pH higher than 11, at a temperature in the range of 60 to 90° C. until the pH is lowered to the range of 9.5 to 10.

2. A process of claim 1 wherein the heating is carried out on a latex containing about 50% solids and the latex, after the heating, is creamed to about 60% solids.

3. A polychloroprene latex having a pH of 9.5 to 10 prepared by the process of claim 1.

4. In a process for producing an elastomeric foam by expanding on aqueous, polychloroprene latex the steps comprising (1) heating a freshly prepared polychloroprene latex, having a pH higher than 11, at a temperature in the range of 60 to 90° C. until the pH is lowered to the range of 9.5 to 10, and (2) adding to the heat-aged latex so produced, while frothing it, about from 10 to 100 parts by weight of an organic polyisocyanate per 100 parts of elastomeric solids in the latex.

5. A process of claim 4 wherein the heating of step (1) is carried out on a latex containing about 50% solids and the latex, after the heating, is creamed to about 60% solids.

6. An elastomeric foam produced by a process of claim 4.

References Cited

UNITED STATES PATENTS

| 2,751,365 | 6/1956 | Scott | 260—29.7 AT |
| 2,993,013 | 7/1961 | Wolfe | 260—3 |
| 3,450,649 | 6/1969 | Youker | 260—3 |

OTHER REFERENCES

Carl, J. C.: Neoprene Latex, (1962), E.I. duPont de Nemours & Co., pp. 8, 9 and 133.

MURRAY TILLMAN, Primary Examiner

W. J. BRIGGS, SR., Assistant Examiner

U.S. Cl. X.R.

260—2.5 AT, 29.7 NR, 29.7 R, 890